United States Patent
Hirayama et al.

(10) Patent No.: US 10,030,563 B2
(45) Date of Patent: Jul. 24, 2018

(54) REDUCING-AGENT INJECTOR GASKET AND EXHAUST-GAS POSTTREATMENT APPARATUS INCLUDING SAME

(71) Applicant: KOBELCO CONSTRUCTION MACHINERY CO., LTD., Hiroshima-shi (JP)

(72) Inventors: Michio Hirayama, Hiroshima (JP); Taisuke Ikeda, Hiroshima (JP); Seiichi Onishi, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 15/141,071

(22) Filed: Apr. 28, 2016

(65) Prior Publication Data

US 2016/0348559 A1    Dec. 1, 2016

(30) Foreign Application Priority Data

May 26, 2015    (JP) .................................. 2015-106647

(51) Int. Cl.
*F01N 3/00* (2006.01)
*F01N 3/10* (2006.01)
(Continued)

(52) U.S. Cl.
CPC ........... *F01N 3/2853* (2013.01); *F01N 3/035* (2013.01); *F01N 3/208* (2013.01); *F01N 3/2066* (2013.01);
(Continued)

(58) Field of Classification Search
CPC ............. F01N 13/1827; F01N 2260/10; F01N 2260/20; F01N 2250/02; F01N 2610/01;
(Continued)

(56) References Cited

U.S. PATENT DOCUMENTS

| 6,279,603 B1 * | 8/2001 | Czarnik ............ B01D 53/8625 123/472 |
| 6,539,708 B1 * | 4/2003 | Hofmann ........... B01D 53/8631 239/132.3 |

(Continued)

FOREIGN PATENT DOCUMENTS

| JP | 2007-321647 | 12/2007 |
| JP | 2008-14213 A | 1/2008 |

(Continued)

OTHER PUBLICATIONS

Office Action dated Jan. 10, 2017 in Japanese Patent Application No. 2015-106647 (with English translation).
Extended European Search Report dated Oct. 4, 2016 in Patent Application No. 16168050.9.

*Primary Examiner* — Phutthiwat Wongwian
*Assistant Examiner* — Diem Tran
(74) *Attorney, Agent, or Firm* — Oblon, McClelland, Maier & Neustadt, L.L.P.

(57) ABSTRACT

Provided is a gasket effectively suppressing heat transfer from an exhaust pipe with an injector retention section to a reducing-agent injector. The gasket includes a first plate to contact a retaining wall of the injector retention section, the first plate having a first opening allowing the reducing agent to be injected and a first bolt insert-through hole, a second plate disposed closer to the reducing-agent injector than the first plate, the second plate having a second opening allowing the reducing agent to be injected and a second bolt insert-through hole, and a spacing keeping member that retains a spacing between the first and second plates to form a heat insulation space therebetween. The heat insulation space has a shape allowing at least a part of the heat insulation space to communicate with the outside of the gasket between the first and second plates.

5 Claims, 4 Drawing Sheets

(51) Int. Cl.
*F01N 3/28* (2006.01)
*F01N 3/20* (2006.01)
*F01N 13/18* (2010.01)
*F01N 3/035* (2006.01)

(52) U.S. Cl.
CPC ...... *F01N 13/1827* (2013.01); *F01N 2250/02* (2013.01); *F01N 2260/10* (2013.01); *F01N 2260/20* (2013.01); *F01N 2610/01* (2013.01); *F01N 2610/02* (2013.01); *F01N 2610/03* (2013.01); *F01N 2610/1453* (2013.01); *Y02T 10/24* (2013.01)

(58) Field of Classification Search
CPC ............. F01N 2610/02; F01N 2610/03; F01N 2610/1453; F01N 3/035; F01N 3/2066; F01N 3/208; F01N 3/2853
USPC .................................. 60/286, 295, 301, 303
See application file for complete search history.

(56) References Cited

U.S. PATENT DOCUMENTS

| | | | |
|---|---|---|---|
| 7,467,749 B2* | 12/2008 | Tarabulski | F01N 3/2066 239/132 |
| 2009/0313979 A1 | 12/2009 | Kowada | |
| 2014/0196442 A1* | 7/2014 | Katou | F01N 3/10 60/286 |
| 2014/0237998 A1 | 8/2014 | Fahrenkrug et al. | |
| 2015/0135683 A1 | 5/2015 | Petry | |

FOREIGN PATENT DOCUMENTS

| | | |
|---|---|---|
| JP | 2009-138627 A | 6/2009 |
| JP | 4928304 | 5/2012 |
| JP | 5349715 | 11/2013 |
| JP | 2014-163276 A | 9/2014 |
| WO | WO 2013/178321 A1 | 12/2013 |

* cited by examiner

REDUCING-AGENT INJECTOR GASKET AND EXHAUST-GAS POSTTREATMENT APPARATUS INCLUDING SAME

TECHNICAL FIELD

The present invention relates to a reducing-agent injector gasket and an exhaust-gas posttreatment apparatus including the same.

BACKGROUND ART

In recent years, a urea selective catalytic reduction (SCR) system has been introduced as a technique for purifying nitrogen oxide (NOx) contained in an exhaust gas of a work machine, etc. The urea SCR system utilizes a chemical reaction of ammonia with nitrogen oxide to reduce the ammonia to nitrogen and water. For the safety, not ammonia but urea water is stored in a tank and mounted on the work machine or the like with the tank, and the urea water is injected into an exhaust gas having a temperature of approximately 200°. The injected urea water is hydrolyzed at a high temperature, whereby ammonia gas is generated. The chemical reaction of ammonia gas and nitrogen oxide reduces the nitrogen oxide, thereby generating nitrogen gas and water vapor.

For example, Japanese Patent No. 4928304 discloses an exhaust-gas posttreatment apparatus including a gas collection chamber, a mixing pipe having a rear end face closed by a downstream-side end portion of the gas collection chamber, and an injector for urea water addition, the injector concentrically attached to the rear end face. The injector for urea water addition supplies urea water to the center position of rear end portion of the mixing pipe. This addition requires measures to suppress heat transfer from the mixing pipe to the injector for urea water addition because the temperature of the mixing pipe is generally raised by contact thereof with an exhaust gas.

Japanese Patent No. 5349715 discloses an apparatus including a heat insulation section for suppression of the heat transfer. The apparatus includes an injector for supply of reducing agent, an elbow pipe including an injector retention section, and a gasket interposed between the injector and the injector retention section. The gasket includes an inner plate in contact with a retaining wall of the injector retention section and having an inner opening corresponding to an injection opening, an outer plate in contact with the injector and having an outer opening corresponding to the injection opening, an annular outer-circumference-side support ring held between respective outer circumferential portions of the inner plate and the outer plate, and an annular inner-circumference-side heat insulating ring held between a circumferential edge section of the inner opening of the inner plate and a circumferential edge portion of the outer opening of the outer plate. Inside the gasket is formed an intra-gasket heat insulation space covered with the inner plate, the outer plate, and the outer circumference side and inner circumference side rings.

The intra-gasket heat insulation space, though having a heat insulating function, is completely closed, which causes heat accumulation in the intra-gasket heat insulation space; this may rather deteriorate cooling efficiency, i.e., heat insulation efficiency.

SUMMARY OF INVENTION

It is an object of the present invention to provide a reducing-agent injector gasket capable of effective suppression of heat transfer from an exhaust pipe to a reducing-agent injector and an exhaust-gas posttreatment apparatus including the same.

Provided is a reducing-agent injector gasket to be interposed between a reducing-agent injector capable of injecting a reducing agent and an injector retention section provided to an exhaust pipe, the injector retention section including a retaining wall having an injector opening that allows the reducing agent to be injected from the reducing-agent injector into the exhaust pipe and a retention bolt projecting beyond the retaining wall to retain the reducing-agent injector. The reducing-agent injector gasket includes: a first plate to make contact with the retaining wall, the first plate having a first opening that allows the reducing agent to be injected, in cooperation with the injector opening of the retaining wall, and a first bolt insert-through hole that allows the retention bolt to be inserted through the first bolt insert-through hole; a second plate disposed in a position closer to the reducing-agent injector than the first plate, the second plate having a second opening that allows the reducing agent to be injected, in cooperation with the injector opening, and a second bolt insert-through hole that allows the retention bolt to be insert through the second bolt insert-through hole; and a spacing keeping member that keeps a spacing between the first plate and the second plate so as to form a heat insulation space between the first plate and the second plate. The heat insulation space has a shape that enables at least a part of the heat insulation space to communicate with the outside of the reducing-agent injector gasket between the first plate and the second plate in a state in which the reducing-agent injector is retained by the injector retention section via the reducing-agent injector gasket.

DESCRIPTION OF EMBODIMENTS

An embodiment of the present invention is explained below with reference to the drawings.

Figure 2:
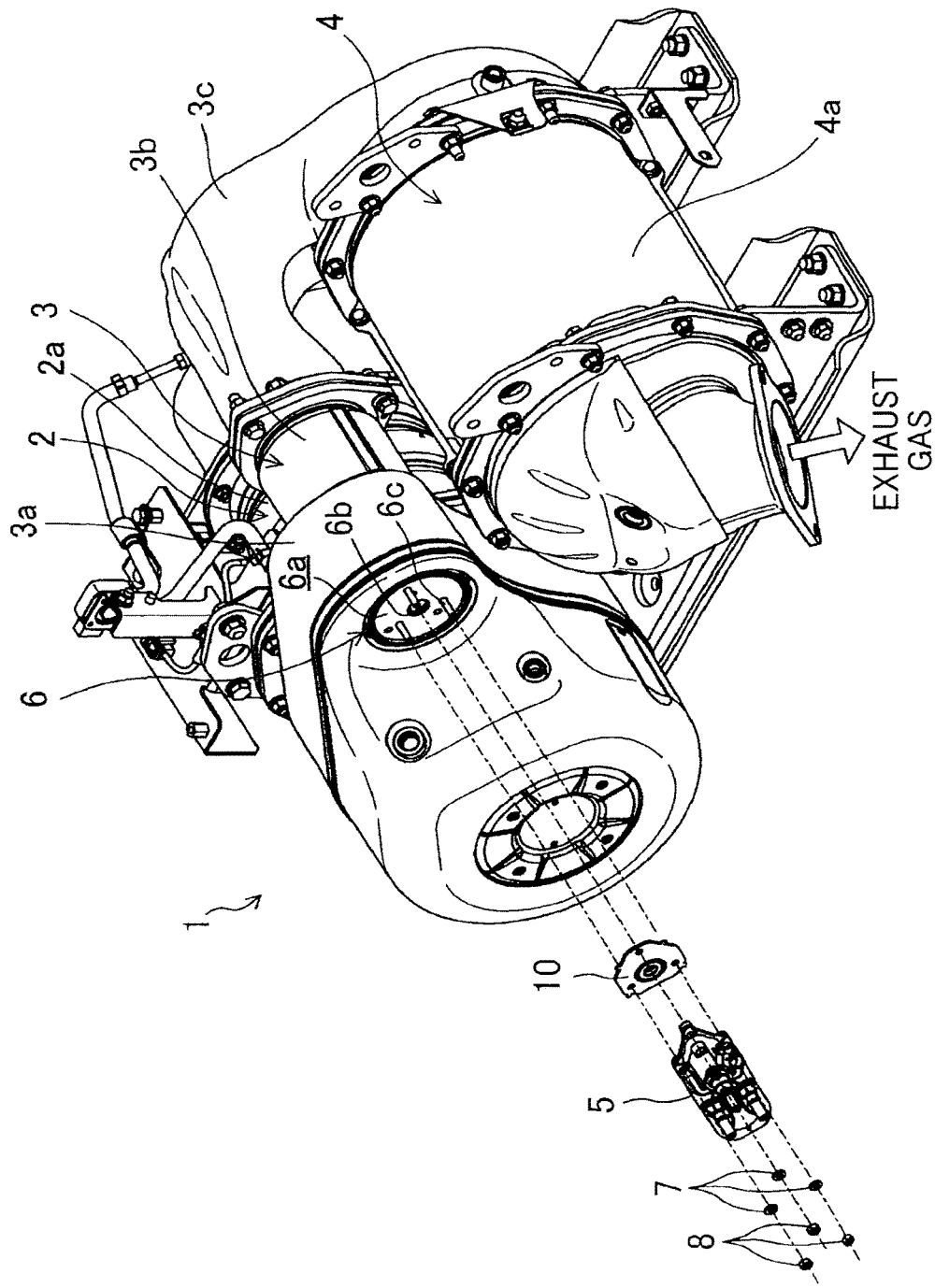
FIG. 2 is an exploded perspective view showing an exhaust-gas posttreatment apparatus including the reducing-agent injector gasket.
Figure 3:
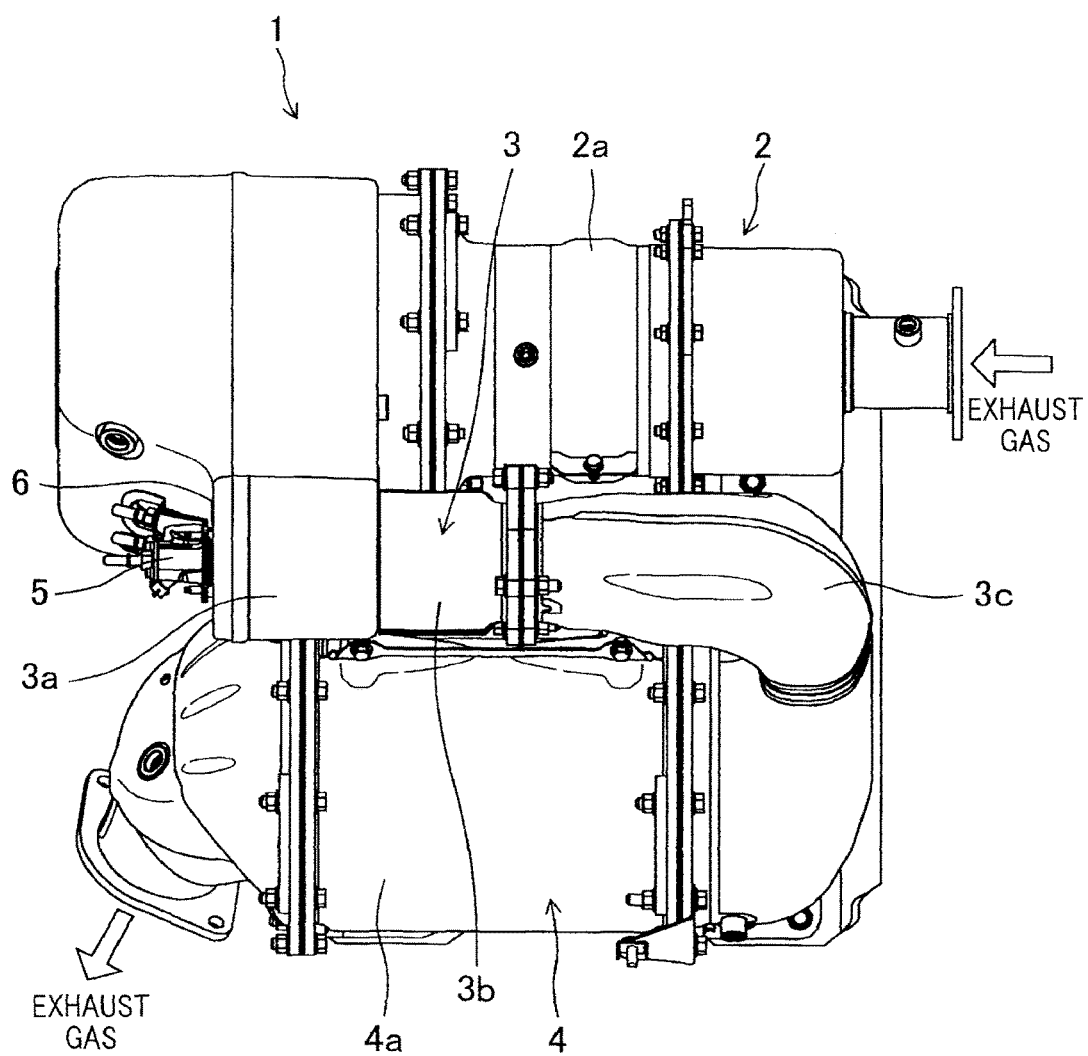
FIG. 3 is a plan view of the exhaust-gas posttreatment apparatus.

FIGS. 2 and 3 show an exhaust-gas posttreatment apparatus 1 according to this embodiment. The exhaust-gas posttreatment apparatus 1 includes a diesel particulate filter (DPF) device 2, which is a filtering device for exhaust gas purification, a reducing-agent-water-solution mixing device (hereinafter referred to as "mixing device") 3, and a selective catalytic reduction (SCR) device 4. The mixing device 3 and the SCR device 4 constitute a urea SCR system. The DPF device 2, the mixing device 3, and the SCR device 4 are connected in this order from an upstream side of a flowing direction of an exhaust gas along an exhaust pipe in which the exhaust gas discharged from a not-shown diesel engine flows. The exhaust-gas posttreatment apparatus 1 is housed in an engine room of a construction machine such as a hydraulic shovel together with the diesel engine.

The DPF device 2, which is located on the upstream-most side in the exhaust-gas posttreatment apparatus 1, includes a cylindrical casing 2a and a not-shown DPF housed in the casing 2a. The DPF plays a role of collecting particulate matters in an exhaust gas passing through the DPF. In the casing 2a is disposed an oxidation catalyst located upstream of the DPF. The oxidation catalyst makes the particulate matters collected by the DPF self-burn with the exhaust gas having a high temperature to thus enable the DPF to be refreshed.

The mixing device 3 is connected to an outlet of the DPF device 2 and adds a urea water solution, which is a reducing-agent water solution, to the flowing exhaust gas. The mixing device 3 includes a plurality of pipes configuring an exhaust pipe that allows the exhaust gas discharged from the DPF device 2 to flow through the pipes and a reducing-agent injector (hereinafter referred to as "injector") 5 capable of injecting urea water serving as a reducing agent into the exhaust pipe. The plurality of pipes include a first elbow pipe 3a, a straight pipe 3b, and a second elbow pipe 3c. The straight pipe 3b is connected to a downstream end of the first elbow pipe 3a and extends substantially in parallel to a flowing direction of the exhaust gas in the DPF device 2. The second elbow pipe 3c is connected to a downstream end of the straight pipe 3b. The exhaust pipe according to the present invention is, however, not limited to a specific form thereof. The injector 5 is attached to the first elbow pipe 3a and injects the urea water solution into the exhaust gas in the first elbow pipe 3a in a direction toward the straight pipe 3b. The urea water solution comes into contact with the high-temperature exhaust gas to be thereby brought into thermal decomposition into ammonia and is supplied to the downstream SCR device 4, together with the exhaust gas, as a reducing agent.

The SCR device 4 includes a cylindrical case 4a and a not-shown SCR catalyst housed in the case 4a. The SCR catalyst plays a role of promoting a chemical reaction for purifying the exhaust gas, that is, an oxidation-reduction reaction of ammonia, which is a reducing agent generated by the mixing device 3, and a nitrogen oxide in the exhaust gas. It is desirable to provide, for example, an ammonia reducing catalyst for promoting oxidation of the ammonia, which has not fully reacted with the nitrogen oxide, and detoxifying the ammonia, in the case 4a.

The exhaust-gas posttreatment apparatus 1 further includes a reducing-agent-injector retention section (hereinafter simply referred to as "injector retention section") 6 and a reducing-agent injector gasket (hereinafter simply referred to as "gasket") 10.

The injector retention section 6 includes a retaining wall 6a provided in the first elbow pipe 3a as shown in FIGS. 2 and 3 and fixed to the first elbow pipe 3a and a plurality of (e.g., three) retention bolts 6c that retain the injector 5.

The retaining wall 6a is formed of, for example, a circular plate member and surrounds a substantially circular injector opening 6b that pierces through a center part of the retaining wall 6a. The injector 5 includes an injection nozzle 5a. The injector 5 is supported by the plurality of retention bolts 6c of the injector retention section 6 in a position which makes the injection nozzle 5a coincident with the injector opening 6b. The injector opening 6b allows the reducing agent (the urea water) to be injected into the exhaust pipe from the injector 5 through the injector opening 6b.

The plurality of retention bolts 6c are fixed to the retaining wall 6a so as to project beyond the retaining wall 6a toward the injector 5 around the injector opening 6b. The specific number of the plurality of retention bolts 6c is set according to the specifications of the injector 5. The retaining wall 6a has an inner circumferential edge portion surrounding the injector opening 6b, the inner circumferential edge portion constituting a recessed portion 6d recessed toward the injector 5 beyond the other portions. The recessed section 6d has a shape with a diameter gradually increasing toward the straight pipe 3b.

Figure 4:
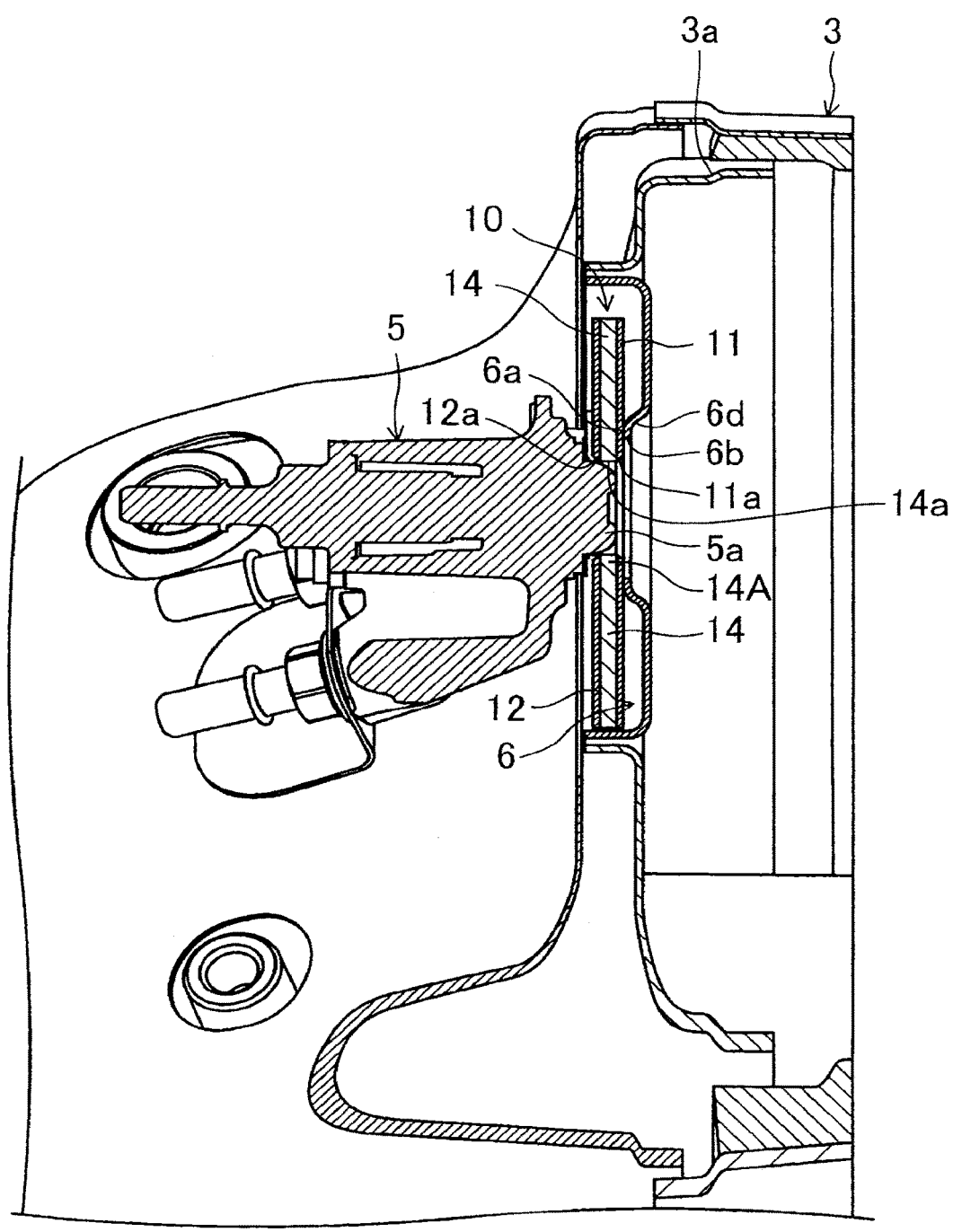
FIG. 4 is a sectional view showing the reducing-agent injector and the periphery of the reducing-agent injector in enlargement.

The gasket 10 is disposed between the injector retention section 6 and the injector 5. The gasket 10 is formed in, for example, a polygonal shape. Although the gasket 10 shown in FIG. 4 is formed in an octagonal shape, the shape of the gasket according to the present invention is not limited. The shape of the gasket may be another polygonal shape, a circular shape, or an elliptical shape.

Figure 1:
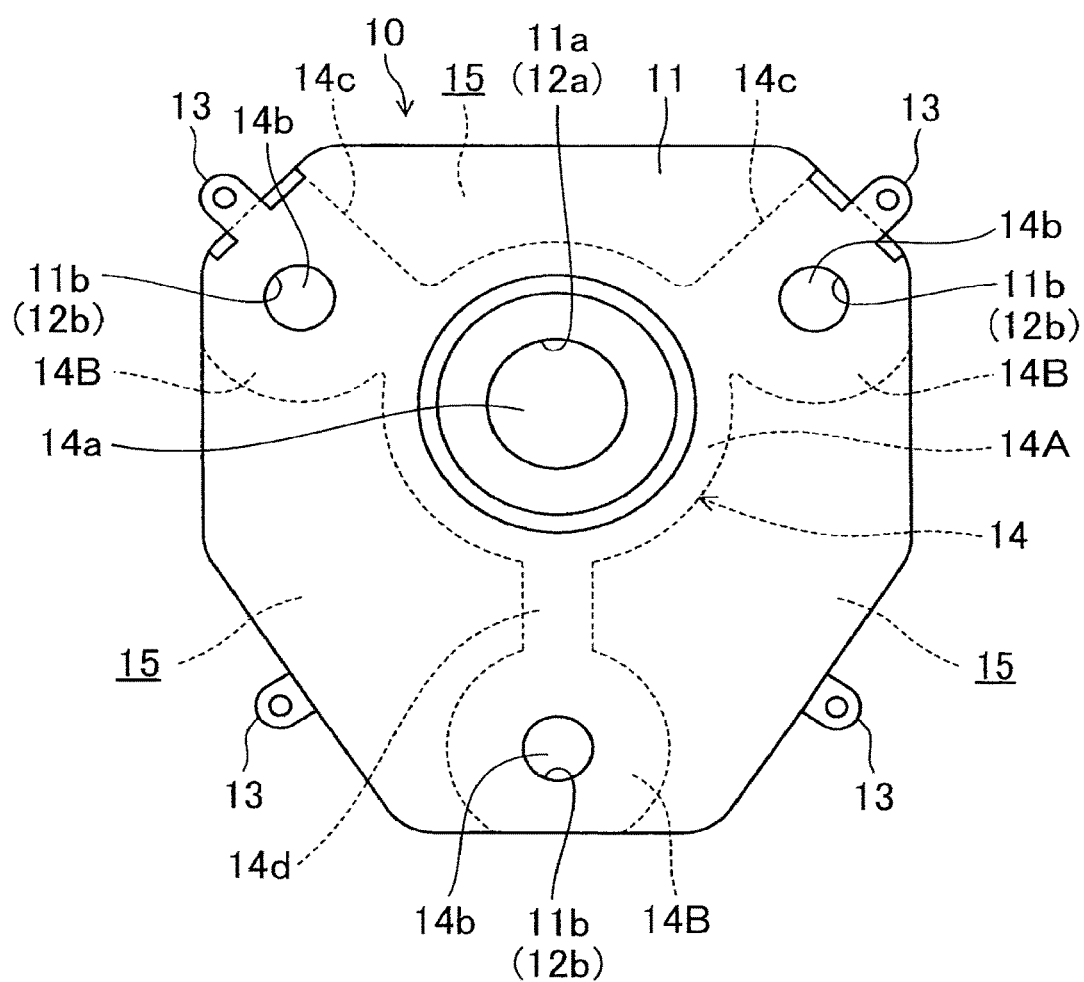
FIG. 1 is a front view of a reducing-agent injector gasket according to an embodiment of the present invention.

As shown in FIGS. 1 and 4 in enlargement, the gasket 10 includes a first plate 11, a second plate 12, and a heat insulation member 14. Each of the first and second plates 11 and 12 is formed of, for example, a thin plate made of stainless steel. The heat insulation member 14 is made of a material having thermal conductivity lower than the thermal conductivity of the first and second plates 11 and 12.

The first plate 11 is disposed in contact with the retaining wall 6a of the injector retention section 6. The first plate 11 is formed with a first opening 11a corresponding to the injector opening 6b of the retaining wall 6a and a plurality of (e.g., three) first bolt insert-through holes 11b as many as the retention bolts 6c. The first opening 11a allows the reducing agent to be injected from the injector 5 through the first opening 11a. The first bolt insert-through holes 11b allow the respective retention bolts 6c to be inserted through.

The second plate 12 is disposed in contact with the distal end of the injector 5. The second plate 12 is formed with a second opening 12a corresponding to the injector opening 6b and a plurality of (e.g., three) second bolt insert-through holes 12b as many as the retention bolts 6c. The second opening 12a allows the reducing agent to be injected from the injector 5 through the second opening 12a, specifically, allows the injection nozzle 5a to be inserted into the second opening 12a. The second bolt insert-through holes 12b allow respective retention bolts 6c to be inserted through.

The first and second plates 11 and 12 include a plurality of (e.g., four) joining protrusions 13 for joining the plates 11 and 12, respectively. Each of the joining protrusions 13 includes a base portion projecting from each of outer circumferential sections of the first and second plates 11 and 12 toward the plate 12 or 11 on the other side and a distal end portion projecting outward from the projecting end of the base portion. The joining protrusions 13 opposed to each other also serve as a spacing keeping member for keeping a predetermined space between the first plate 11 and the second plate 12 by mutual contact of the distal end portions of the joining protrusions 13.

The heat insulation member 14 is held between the first plate 11 and the second plate 12. The heat insulation member 14 integrally includes a main body section 14A in the center and a plurality of bolt insert-through sections 14B arranged around the main body section 14A. The main body section 14A has an annular shape surrounding a heat insulation member opening 14a. The heat insulation member opening 14a coincides with the first opening 11a and the second opening 12a to thereby allow, in cooperation with the first and second openings 11a and 12a, the reducing agent to be injected from the injector 5 through the injector opening 6b. The heat insulation member opening 14a according to this embodiment allows, in cooperation with the second opening 12a, the injection nozzle 5a of the injector 5 to be inserted into the openings 12a and 14a. Each of the bolt insert-through sections 14B has an annular shape surrounding a heat-insulation-member-bolt insert-through hole 14b. The heat-insulation-member-bolt insert-through hole 14b coincides with the first bolt insert-though holes 11b and the second bolt insert-through holes 12b to thereby allow the retention bolt 6c to be inserted through, in cooperation with the first and second bolt insert-through holes 11b and 12b.

It is desirable that the heat insulation member 14 is, for example, formed of a graphite sheet for high temperature and replaced every time a predetermined operation time elapses.

Although being annular, each of the main body section 14A and the bolt insert-through sections 14B may include a linear section 14c shown in FIG. 1. The bolt insert-through sections 14B are disposed so as to surround the main body section 14A and integrally joined to the main body section 14A. The main body section 14A and the bolt insert-through sections 14B may be joined such that respective parts of respective annular portions thereof mutually overlap as indicated by two bolt insert-through sections 14B on the upper side in FIG. 1 or may be joined, for example, through a linear coupling section 14d as indicated by the bolt insert-through sections 14B on the lower side in FIG. 1.

The heat insulation member 14 has a shape of allowing at least a part of the heat insulation member 14 to communicate with the outside air in a state in which the injector 5 is retained by the injector retention section 6, that is, a shape being opened to the outside of the gasket 10. In this embodiment, respective distal end portions (flat portions) of the joining protrusions 13 in the outer circumferential sections of the first and second plates 12 make contact with each other and joined by, for example, caulking, welding, or the like, while, in a region where the joining protrusions 13 are absent, the substantially entire outer circumferential section of the heat insulation member 14 is opened to the outside, thus allowed to be exposed to the outside air.

The heat insulation member 14 does not have an external shape of occupying the entire space between the first plate 11 and the second plate 12 but has an external shape capable of forming a heat insulation space 15, in which the heat insulation member 14 is absent, between the first plate 11 and the second plate 12; the heat insulation member 14 in this embodiment has an external shape smaller than the external shape of the first and second plates 11 and 12. More specifically, the heat insulation member 14 according to this embodiment, though including the annular main body section 14A surrounding the heat insulation member opening 14a that allows the injection nozzle 5a to be inserted through and the plurality of annular bolt insert-through sections 14B surrounding the heat-insulation-member-bolt insert-through holes 14b that allow insertion-through of the retention bolts 6c, allows the heat insulation space 15 communicating with the outside air to be formed in a region where the heat insulation member 14 is absent, specifically, a region between the bolt insert-through sections 14B adjacent to each other.

As shown in FIG. 2, the thus configured gasket 10 can be surely fixed between the retaining wall 6a and the injector 5 by inserting the retention bolts 6c through the first bolt insert-through holes 11b, the second bolt insert-through holes 12b, and the heat-insulation-member-bolt insert-through holes 14b of the gasket 10, inserting the retention bolts 6c through the plurality of bolt insert-through holes provided in the injector 5, and attaching and fastening, for example, washers 7 and nuts 8 to the retention bolts 6c.

As explained above, in this embodiment, the gasket 10 interposed between the injector 5 and the retaining wall 6a forms the heat insulation space 15, which suppresses heat transfer from exhaust gas to the injector 5 to thereby enable the urea water solution in the injector 5 to be prevented from deterioration due to high temperature. Moreover, the heat insulation space 15 communicating with the outside air is capable of suitable radiation, which allows a high heat insulation effect to be achieved, compared with a closed heat insulation space.

In particular, according to the gasket 10 in this embodiment, the heat insulation member 14 interposed between the first and second plates 11 and 12 further suppresses the heat transfer from the exhaust gas to the injector 5. Also the heat insulation member 14, exposed to the outside air, is capable of suitable radiation, which allows a high heat insulation effect to be achieved, compared with a heat insulation member closed in a gasket.

The heat insulation member 14, integrally including the main body section 14A surrounding the heat insulation member opening 14a corresponding to the injection nozzle 5a of the injector 5 and the plurality of bolt insert-through sections 14B through which the retention bolts 6c can be inserted, can have the small number of components and can be easily positioned. Specifically, only by respective insertions of the retention bolts 6c corresponding to the bolt insert-through holes 14b through the respective bolt insert-through holes 14b, the heat insulation member opening 14a in the center and the injector opening 6b can be automatically aligned with each other. This enables assembly efficiency to be markedly improved.

As explained above, the gasket (the reducing-agent injector gasket) 10 according to this embodiment effectively suppresses, with a simple configuration, heat transfer from the first elbow pipe 3a and the like to the injector 5. This makes it possible to provide the high-quality exhaust-gas posttreatment apparatus 1 capable of restraining urea water solution in the injector 5 from deterioration.

The embodiment explained above is essentially a preferred illustration and is not meant to limit the present invention, applications of the present invention, and a range of use of the present invention.

For example, the heat insulation space 15 may be secured by a spacer made of a material having heat transfer properties instead of the heat insulation member 14 according to the embodiment. The spacer, if being made of a metal material such as a stainless steel material, can suppress heat transfer less than the embodiment but has an advantage of eliminating the necessity for exchange of the spacer and having high rigidity of the spacer is high.

The main body section 14A and the plurality of bolt insert-through sections 14B according to the embodiment may be configured as a plurality of heat insulation members independent of each other. Although increasing the number of heat insulation members, the configuration has an advantage of a larger total heat radiation area of the heat insulation members than that of a single heat insulation member.

As explained above, provided is a reducing-agent injector gasket capable of effectively suppressing heat transfer from an exhaust pipe to a reducing-agent injector and an exhaust-gas posttreatment apparatus including the same.

Provided is a reducing-agent injector gasket to be interposed between a reducing-agent injector capable of injecting a reducing agent and an injector retention section provided to an exhaust pipe, the injector retention section including a retaining wall having an injector opening that allows the reducing agent to be injected from the reducing-agent injector into the exhaust pipe and a retention bolt projecting beyond the retaining wall to retain the reducing-agent injector. The reducing-agent injector gasket includes: a first plate to make contact with the retaining wall, the first plate having a first opening that allows the reducing agent to be injected, in cooperation with the injector opening of the retaining wall, and a first bolt insert-through hole that allows the retention bolt to be inserted through the first bolt insert-through hole; a second plate disposed in a position closer to the reducing-agent injector than the first plate, the second plate having a second opening that allows the reducing agent to be injected, in cooperation with the injector opening, and a second bolt insert-through hole that allows the retention bolt to be insert through the second bolt insert-through hole; and a spacing keeping member that keeps a spacing between the first plate and the second plate so as to form a heat insulation space between the first plate and the second plate. The heat insulation space has a shape that enables at least a part of the heat insulation space to communicate with the outside of the reducing-agent injector gasket between the first plate and the second plate in a state in which the reducing-agent injector is retained by the injector retention section via the reducing-agent injector gasket.

The heat insulation space formed between the first and second plates in the reducing-agent injector gasket interposed between the reducing-agent injector and the retaining wall as explained above can effectively suppress heat transfer from the exhaust gas in the exhaust pipe to the reducing-agent injector, thereby preventing the reducing agent, for example, a urea water solution in the injector from deterioration due to a high temperature. Besides, the heat insulation space exposed to the outside air between the first plate and the second plate is capable of suitable radiation, which allows a high heat insulation effect to be achieved, compared with a closed heat insulation space.

The spacing keeping member is suitably a heat insulation member interposed between the first plate and the second plate and having an external shape smaller than respective external shapes of the first plate and the second plate so as to form the heat insulation space around the heat insulation member. The heat insulation member can further improve the heat insulation effect in cooperation with the heat insulation space formed on the outer side of the heat insulation member.

In this case, the heat insulation member is suitably a heat insulation member including an annular main body section surrounding a heat insulation member opening that allows the reducing agent to be injected from the reducing-agent injector, in cooperation with the first opening and the second opening, and an annular bolt insert-through section surrounding a heat-insulation-member-bolt insert-through hole that allows the retention bolt to be inserted through, in cooperation with the first bolt insert-through hole and the second bolt insert-through hole. The heat insulation member can be efficiently disposed in a region between the first and second plates while allowing the injection of the reducing agent and the insertion-through of the retention bolt. The "annular shape" only has to be a shape surrounding the heat insulation member opening and the heat-insulation-member-bolt insert-through hole, not required to have a circular outer circumference.

It is more desirable that the main body section of the heat insulation member and the bolt insert-through section are integrally joined. This enables the number of components of the heat insulation member to be decreased and facilitates positioning the heat insulation member between the first plate and the second plate to allow assembly efficiency to be improved.

The present invention also provides an exhaust-gas posttreatment apparatus for performing posttreatment of an exhaust gas flowing in an exhaust pipe. The apparatus includes a reducing-agent injector capable of injecting a reducing agent into the exhaust pipe, an injector retention section provided in the exhaust pipe and including a retaining wall having an injector opening that allows the reducing agent to be injected into the exhaust pipe from the reducing-agent injector and a retention bolt that projects beyond the retaining wall to retain the reducing-agent injector, and a reducing-agent injector gasket to be interposed between the reducing-agent injector and the injector retention section, the gasket having the above-described configuration.

This application is based on Japanese Patent application No. 2015-106647 filed in Japan Patent Office on May 26, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A reducing-agent injector gasket to be interposed between a reducing-agent injector configured to inject a reducing agent and an injector retention section provided in an exhaust pipe, the injector retention section including a retaining wall having an injector opening that allows the reducing agent to be injected from the reducing-agent injector into the exhaust pipe and a retention bolt projecting beyond the retaining wall to retain the reducing-agent injector, the reducing-agent injector gasket comprising:
    a first plate to make contact with the retaining wall, the first plate having a first opening that allows the reducing agent to be injected, in cooperation with the injector opening of the retaining wall, and a first bolt insert-through hole that allows the retention bolt to be inserted through the first bolt insert-through hole;
    a second plate disposed in a position closer to the reducing-agent injector than the first plate, the second plate having a second opening that allows the reducing agent to be injected, in cooperation with the injector opening, and a second bolt insert-through hole that allows the retention bolt to be insert through the second bolt insert-through hole; and
    a heat insulation member that keeps a spacing between the first plate and the second plate so as to form a heat insulation space between the first plate and the second plate in a region where the heat insulation member and joining protrusions of the first and the second plate are absent, the heat insulation member being a member made of a material having thermal conductivity lower than the thermal conductivity of the first place and second plate,
    wherein the heat insulation space has a shape that enables at least a part of the heat insulation space to communicate with the outside air of the reducing-agent injector gasket between the first plate and the second plate in a state in which the reducing-agent injector is retained by the injector retention section via the reducing-agent injector gasket, and
    wherein the heat insulation member has an external shape smaller than the external shape of the first and second plates.

2. The reducing-agent injector gasket according to claim 1, wherein the heat insulation space is formed around the heat insulation member.

3. The reducing-agent injector gasket according to claim 2, wherein the heat insulation member includes an annular main body section surrounding a heat insulation member opening that allows the reducing agent to be injected from the reducing-agent injector, in cooperation with the first opening and the second opening and an annular bolt insert-through section surrounding a heat-insulation-member-bolt insert-through hole that allows the retention bolt to be inserted through, in cooperation with the first bolt insert-through hole and the second bolt insert-through hole.

4. The reducing-agent injector gasket according to claim 3, wherein the main body section of the heat insulation member and the bolt insert-through section are integrally joined.

5. An exhaust-gas posttreatment apparatus for performing posttreatment of an exhaust gas flowing in an exhaust pipe, the exhaust-gas posttreatment apparatus comprising:
- a reducing-agent injector configured to inject a reducing agent into the exhaust pipe;
- an injector retention section provided in the exhaust pipe and including a retaining wall having an injector opening that allows the reducing agent to be injected into the exhaust pipe from the reducing-agent injector and a retention bolt that projects beyond the retaining wall to retain the reducing-agent injector; and
- the reducing-agent injector gasket according to claim 1 interposed between the reducing-agent injector and the injector retention section.

* * * * *